July 28, 1970   C. L. EMSBACH   3,521,821
IRRIGATION SYSTEM
Filed April 15, 1968

INVENTOR.
CLAYTON L. EMSBACH
BY
ATTORNEY

United States Patent Office 3,521,821
Patented July 28, 1970

3,521,821
IRRIGATION SYSTEM
Clayton L. Emsbach, 1540 Rubenstein Ave.,
Encinitas, Calif. 92024
Filed Apr. 15, 1968, Ser. No. 721,339
Int. Cl. A01g 27/00
U.S. Cl. 239—145       2 Claims

ABSTRACT OF THE DISCLOSURE

A porous tube for irrigation purpose, the tube being formed of porous Dacron.

BACKGROUND OF THE INVENTION

Field of the invention

The field of the invention is that of irrigation wherein a porous tube feeds water to the soil. Such porous tubes, under certain installations, are connected in parallel along the length of a water conduit.

Description of the prior art

All porous tubes heretofore employed for irrigation purpose have been defective in that they readily deteriorated.

SUMMARY OF THE INVENTION

A tube for supplying water along the length thereof is made of porous Dacron. Also more specifically, these tubes may be connected in parallel along the length of a water conduit.

Other features and the advantages of the present invention will be apparent from the following description, reference being made to the accompanying drawing wherein a preferred embodiment of the invention is illustrated.

DESCRIPTION OF THE PREFERRED EMBODIMENT

The tube 20 of the present invention is formed of porous Dacron, such as that manufactured and sold by Wellington Sears Company of 111 W. 40th St., New York, N.Y. 10018, under its specification No. 11-3677-03. The material weighs four and seven-tenths ounces per square yard and is a three-by-one twill of two-hundred fifty denier filament polyester fiber. The tubes can be formed in any suitable manner.

Figure 1:
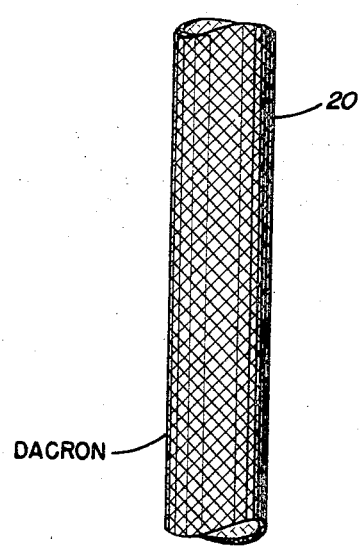
FIG. 1 is a side view of a tube.
Figure 2:
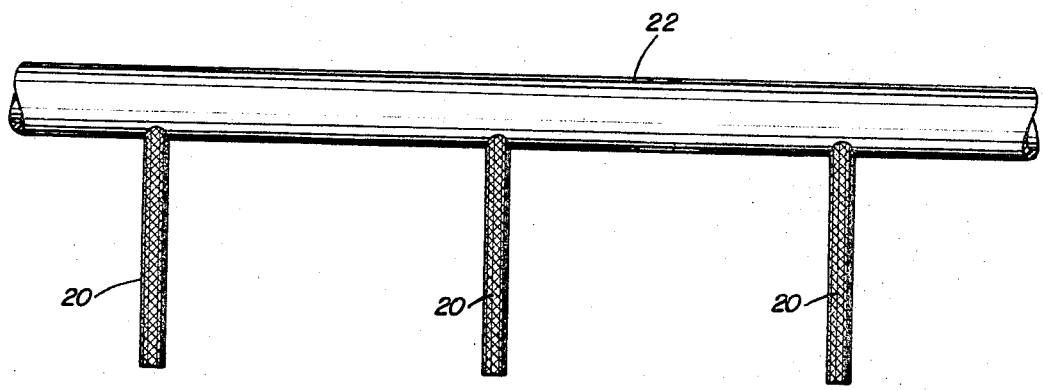
FIG. 2 is a view showing one of the many applications for the tubes of the present invention.

The tube can be employed singly or a plurality of these tubes can be arranged parallelly, as shown in FIG. 2. Here the tubes 20 are connected in parallel in any suitable manner to holes along the length of a water conduit 22. When employed in a hot house, I prefer to connect the tubes as shown in FIG. 2. Water conduits extend lengthwise of the bench, which bench carries the ground in which the plants grow, and the tubes 20 extend transversely of the bench. The diameter of the tubes is preferably approximately five sixteenth of an inch.

I have found, in actual practice, that all heretofore attempts to form porous tubing for irrigating have been unsuccessful due to rapid deterioration of the materials used. Conversely, in actual practice, I have found that the tubes, made from material of the foregoing specifications, do not deteriorate.

While the form of embodiment herein shown and described constitutes a preferred form, it is to be understood that other forms may be adopted.

I claim:
1. An irrigation system of the type employing a water conduit having a plurality of openings along the length thereof, the combination therewith of tubing connected with the openings, each of said tubing being formed of Dacron of the character of approximately four and seven-tenths ounces per square yard with twill of three-by-one of approximately two hundred and fifty denier filament.
2. An irrigation system as defined in claim 1, characterized in that the diameter of the tube is approximately five-sixteenths of an inch.

References Cited

UNITED STATES PATENTS

| | | | |
|---|---|---|---|
| 3,085,364 | 4/1963 | Chapin | 239—65 |
| 3,315,895 | 4/1967 | Klingbeil et al. | 239—145 |
| 3,374,955 | 3/1968 | Hester | 239—145 |
| 3,429,125 | 2/1969 | Shotton | 239—145 |

EVERETT W. KIRBY, Primary Examiner

U.S. Cl. X.R.

62—12; 138—124; 239—450, 602